C. F. DOLL.
EGG CARRIER.
APPLICATION FILED AUG. 17, 1914.

1,193,128. Patented Aug. 1, 1916.

Witnesses

Inventor
C. F. Doll.

By
Attorneys

UNITED STATES PATENT OFFICE.

CHARLES F. DOLL, OF ABERDEEN, WASHINGTON.

EGG-CARRIER.

1,193,128.   Specification of Letters Patent.   Patented Aug. 1, 1916.

Application filed August 17, 1914. Serial No. 857,148.

*To all whom it may concern:*

Be it known that I, CHARLES F. DOLL, a citizen of the United States, residing at Aberdeen, in the county of Chehalis, State of Washington, have invented certain new and useful Improvements in Egg-Carriers; and I do hereby declare the following to be a full, clear, and exact description of the invention, such as will enable others skilled in the art to which it appertains to make and use the same.

This invention relates to shipping boxes, particularly to egg carriers, and has for its object the provision of a simple and novel device in which a plurality of eggs may be placed and resiliently supported so that they will not be broken during transit.

An important object is the provision of an egg carrier provided with means whereby the eggs are supported individually and are held firmly in place by resilient members which firmly clamp each egg.

Other objects and advantages such as simplicity, cheapness in manufacture, efficiency and durability in service and the general improvement of the art will be carefully brought out in the following description and illustrated in the accompanying drawing, in which—

Figure 1:
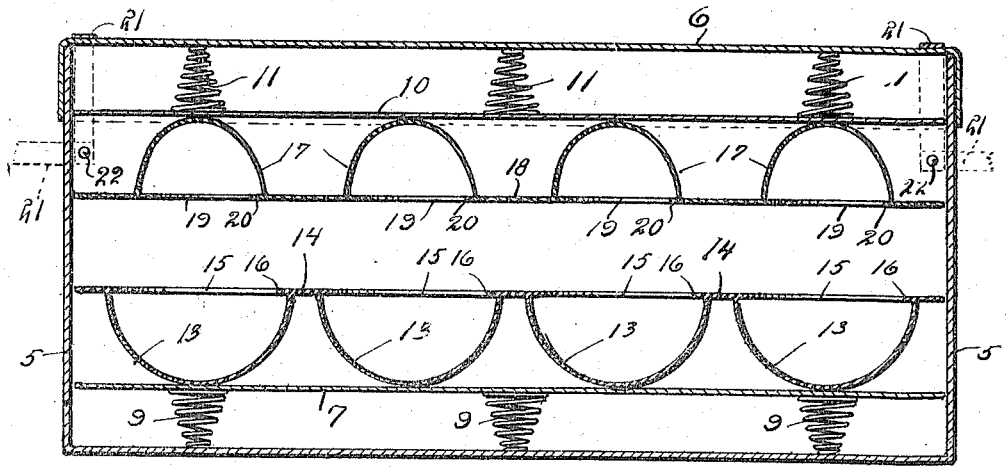
Figure 2:
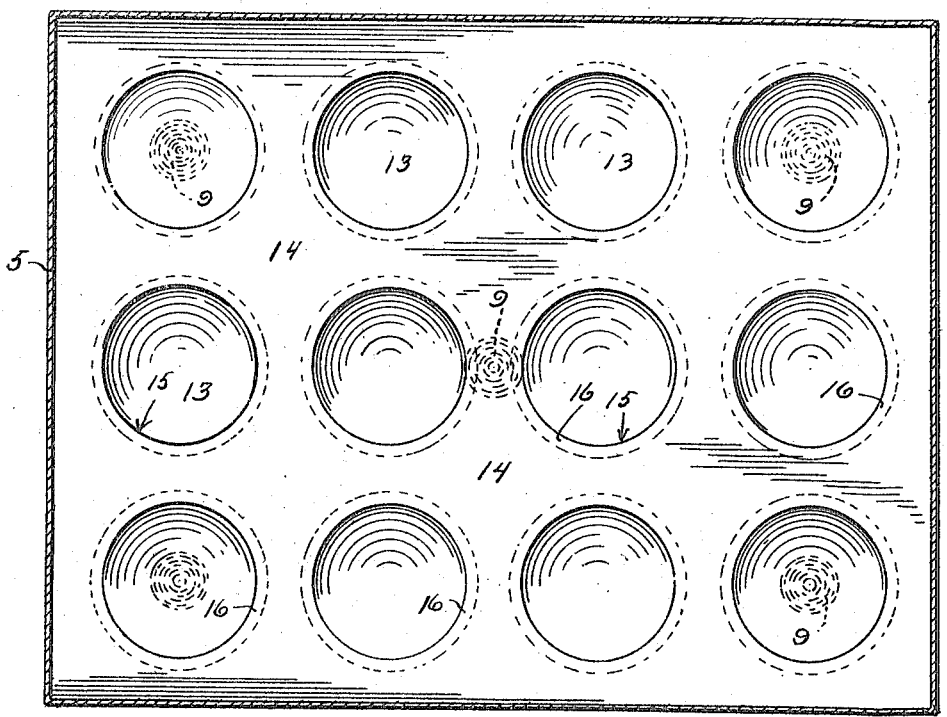

Figure 1 is a vertical sectional view through my novel egg carrier, and Fig. 2 is a horizontal sectional view therethrough.

Referring more particularly to the drawing the numeral 5 designates a preferably rectangular casing with which is adapted to coöperate a cover 6 for forming a closure therefor. Disposed within the casing 5 is a plate 7, preferably of metal yieldably supported within the casing by coil springs 9 which abut against the plate 7 and the bottom. A second plate 10 is yieldably supported upon the cover 6 by coil springs 11. The springs 9 and 11 may be prevented from displacement by lugs on the plates 7 and 10 and the bottom of the casing and the cover, or the ends of the springs may be soldered or otherwise secured.

In order that eggs may be supported within the device, I provide a plurality of cups 13 formed of rubber and secured upon a plate 14 also of rubber. The plate 14 is provided with openings 15 of less diameter than the tops of the cups 13 to provide flanges 16 adapted to closely embrace the ends placed within the cups. These flanges being resilient will grip eggs of small or large diameter, within certain limits. The cups 13 rest upon the plate 7 and are adapted to receive the larger ends of eggs to be carried. The upper section 6 is also provided with a similar structure comprising cups 17 formed of rubber and secured upon a rubber plate 18 having openings 19 of less diameter than the cups 17 to form flanges 20, adapted to encircle and closely embrace the eggs. The cups 17 are made smaller than the cups 13 so as to receive and engage the smaller ends of the eggs.

The device is used by placing the eggs within the cups 13, placing the plate 18 carrying the cups 17 in place over the eggs and positioning the section 6 upon the section 5. The section 6 may be secured upon the section 5 in any desired manner though I preferably provide U-shaped metallic strips 21 pivoted as at 22 upon the section 5 and normally engaging the top section 6 for clamping the top in position. When the strips 21 are swung outwardly, as indicated by dotted lines in Fig. 1, they will serve effectively as bails or handles.

From the foregoing description taken in conjunction with the accompanying drawing it will be apparent that I have thus provided a novel and simple device in which eggs may be supported in such manner as not to be broken in transit through the mail, by express or any other transportation means.

It will be readily understood that I reserve the right to make various changes in the form, construction and arrangement of parts without departing from the spirit of the invention or limiting the scope of the subjoined claim.

Having thus described my invention, I claim:

An egg carrier comprising a pair of rubber plates held in spaced parallel relation and having perforations, the perforations of one plate being larger than those of the other plate and positioned each in axial alinement with a perforation of the opposite plate, whereby they will embrace the point and butt portions of an egg respectively, a rubber cup disposed over each perforation of each plate at the opposite side thereof from the other plate, and means for yieldably sustaining the rubber cups.

In testimony whereof, I affix my signature, in the presence of two witnesses.

CHARLES F. DOLL.

Witnesses:
 JENNIE ISACSON,
 R. E. TAGGART.

Copies of this patent may be obtained for five cents each, by addressing the "Commissioner of Patents, Washington, D. C."